(12) United States Patent
Grab et al.

(10) Patent No.: US 12,731,606 B2
(45) Date of Patent: Sep. 8, 2026

(54) READ HEAD WITH MULTIPLE CONTACTS FORMED UNDERNEATH THE SENSOR

(71) Applicant: Western Digital Technologies, Inc., San Jose, CA (US)

(72) Inventors: Jennifer L. Grab, San Jose, CA (US); Howard G. Zolla, Los Gatos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 23 days.

(21) Appl. No.: 18/753,767

(22) Filed: Jun. 25, 2024

(65) Prior Publication Data

US 2025/0391433 A1 Dec. 25, 2025

(51) Int. Cl.
*G11B 5/39* (2006.01)
*G11B 5/37* (2006.01)

(52) U.S. Cl.
CPC ............ *G11B 5/3912* (2013.01); *G11B 5/374* (2013.01); *G11B 5/3906* (2013.01); *G11B 5/3932* (2013.01); *G11B 5/398* (2013.01); *G11B 2005/3996* (2013.01)

(58) Field of Classification Search
None
See application file for complete search history.

(56) References Cited

U.S. PATENT DOCUMENTS 6,430,011 B1 8/2002 Garfunkel et al.
6,473,277 B1 10/2002 Gill
6,952,328 B2 * 10/2005 Hasegawa et al. .. G11B 5/3903 360/324.2
8,164,861 B2 * 4/2012 Braganca et al. ... G11B 5/3903 360/313
8,208,228 B2 * 6/2012 Maat et al. .......... G11B 5/3977 360/319

(Continued)

FOREIGN PATENT DOCUMENTS

FR 2772965 A1 6/1999
JP H08241508 A 9/1996

(Continued)

OTHER PUBLICATIONS

Childress, Jeffrey R et al., "Magnetic recording read head sensor technology", Elsevier, vol. 6, 2005, pp. 997-1012, <https://www.sciencedirect.com/science/article/pii/S1631070505001684>.

(Continued)

*Primary Examiner* — Craig A. Renner
(74) *Attorney, Agent, or Firm* — Patterson + Sheridan, LLP

(57) ABSTRACT

The present disclosure generally relates to a magnetic recording device comprising a read head. The read head comprises a bottom shield, a first lead, a second lead, and a third lead each disposed over the bottom shield at a media facing surface, a sensing layer disposed in contact with at least the second lead, an optional spacer layer, a free layer disposed over the sensing layer or optional spacer layer, a cap layer disposed on the free layer, side shields disposed adjacent to the free layer, and a top shield disposed over the free layer and side shields. In some embodiments, the bottom shield comprises the second lead, or is disposed in contact with the second lead. In other embodiments, the first, second, and third leads are spaced from the bottom shield by an insulating layer.

25 Claims, 9 Drawing Sheets

(56) References Cited

U.S. PATENT DOCUMENTS

| | | | | |
|---|---|---|---|---|
| 8,259,409 | B2 * | 9/2012 | Braganca et al. .... | G11B 5/3903 360/110 |
| 8,432,644 | B2 * | 4/2013 | Braganca et al. .... | G11B 5/3903 360/324 |
| 8,786,987 | B2 * | 7/2014 | Edelman et al. ..... | G11B 5/3932 360/319 |
| 8,891,207 | B1 | 11/2014 | Li et al. | |
| 9,142,232 | B2 * | 9/2015 | Edelman et al. ..... | G11B 5/3977 |
| 9,218,823 | B2 * | 12/2015 | Kief et al. ........... | G11B 5/3912 |
| 9,633,679 | B2 * | 4/2017 | Singleton et al. .... | G11B 5/3912 |
| 9,672,849 | B2 * | 6/2017 | Kief et al. ........... | G11B 5/3912 |
| 11,437,061 | B1 * | 9/2022 | Le et al. .............. | G11B 5/3912 |
| 2010/0214699 | A1 | 8/2010 | Ho et al. | |
| 2015/0213816 | A1 | 7/2015 | Okawa et al. | |
| 2017/0098459 | A1 | 4/2017 | Mastain | |

FOREIGN PATENT DOCUMENTS

| | | | |
|---|---|---|---|
| JP | 2003030803 | A | 1/2003 |
| JP | 2007059908 | A | 3/2007 |

OTHER PUBLICATIONS

Huy, Ho Hoang et al., "Large inverse spin Hall effect in BiSb topological insulator for 4 Tb/in2 magnetic recording technology", Applied Physics Letters, 2023, pp. 1-7, <https://pubs.aip.org/aip/apl/article-abstract/122/5/052401/2874871/Large-inverse-spin-Hall-effect-in-BiSb-topological?redirectedFrom=fulltext>.

* cited by examiner

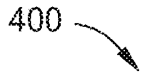
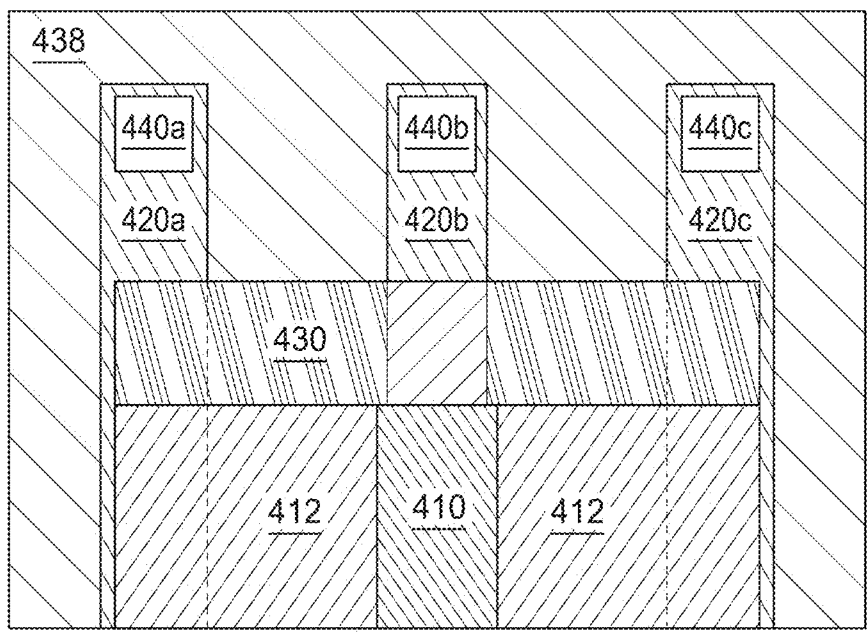
FIG. 4C
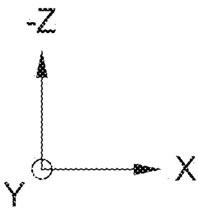

READ HEAD WITH MULTIPLE CONTACTS FORMED UNDERNEATH THE SENSOR

BACKGROUND OF THE DISCLOSURE

Field of the Disclosure

Embodiments of the present disclosure generally relate to magnetic recording devices comprising a read head.

Description of the Related Art

The volume of data processed by a computer is increasing rapidly. To keep up with the volume of data processed, the storing and writing of data to a data storage device, such as a hard disk drive (HDD), must improve to adequately handle the volume of data. There is a need for higher recording density of a magnetic recording medium of the storage device to increase the function and the capability of a computer, and to continue processing the high volumes of data.

In order to achieve higher recording densities, such as recording densities exceeding 2 Tbit/in$^2$ for a magnetic recording medium, the width and pitch of data tracks are reduced, and thus the corresponding magnetically recorded bits encoded in each data track are narrowed. There have been many proposals which attempt to achieve small read back elements in both the down track and cross track directions.

As linear density increases, there is a natural tradeoff between resolution and signal-to-noise ratio (SNR), where either the SNR or the resolution suffers as the other increases. As track pitch decreases and the number of tracks-per-inch (tpi) increases, similar issues arise. Narrower devices which are required to read narrow tracks generally have inferior SNR to wider devices.

Therefore, there is a need in the art for an improved read head capable of reading data with an improved SNR and recording density.

SUMMARY OF THE DISCLOSURE

The present disclosure generally relates to a magnetic recording device comprising a read head. The read head comprises a bottom shield, a first lead, a second lead, and a third lead each disposed over the bottom shield at a media facing surface, a sensing layer disposed in contact with at least the second lead, an optional spacer layer, a free layer disposed over the sensing layer or optional spacer layer, a cap layer disposed on the free layer, side shields disposed adjacent to the free layer, and a top shield disposed over the free layer and side shields. In some embodiments, the bottom shield comprises the second lead, or is disposed in contact with the second lead. In other embodiments, the first, second, and third leads are spaced from the bottom shield by an insulating layer.

In one embodiment, a read head comprises a bottom shield, a first lead disposed over the bottom shield, a second lead disposed adjacent to the first lead, a third lead disposed adjacent to the second lead, a sensing layer disposed in contact with at least the second lead, a free layer disposed over the sensing layer, a first side shield disposed adjacent to the free layer, a second side shield disposed adjacent to the free layer, and a top shield disposed over the free layer and the first and second side shields.

In another embodiment, a read head comprises a bottom shield comprising a first lead, a second lead disposed over the bottom shield adjacent to the first lead, a third lead disposed over the bottom shield adjacent to the first lead, a sensing layer disposed in contact with at least the first lead, a free layer disposed over the sensing layer, a first side shield disposed adjacent to the free layer, a second side shield disposed adjacent to the free layer, and a top shield disposed over the free layer and the first and second side shields.

In yet another embodiment, a read head comprises a bottom shield comprising a notch, a first lead disposed in contact with the notch, a second lead disposed adjacent to the first lead, a third lead disposed adjacent to the first lead, a sensing layer disposed in contact with at least the first lead, a free layer disposed over the sensing layer, and a top shield disposed over the free layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4A-4C illustrate a read head, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording device comprising a read head. The read head comprises a bottom shield, a first lead, a second lead, and a third lead each disposed over the bottom shield at a media facing surface, a sensing layer disposed in contact with at least the second lead, an optional spacer layer, a free layer disposed over the sensing layer or optional spacer layer, a cap layer disposed on the free layer, side shields disposed adjacent to the free layer, and a top shield disposed over the free layer and side shields. In some embodiments, the bottom shield comprises the second lead, or is disposed in contact with the second lead. In other embodiments, the first, second, and third leads are spaced from the bottom shield by an insulating layer.

Figure 1:
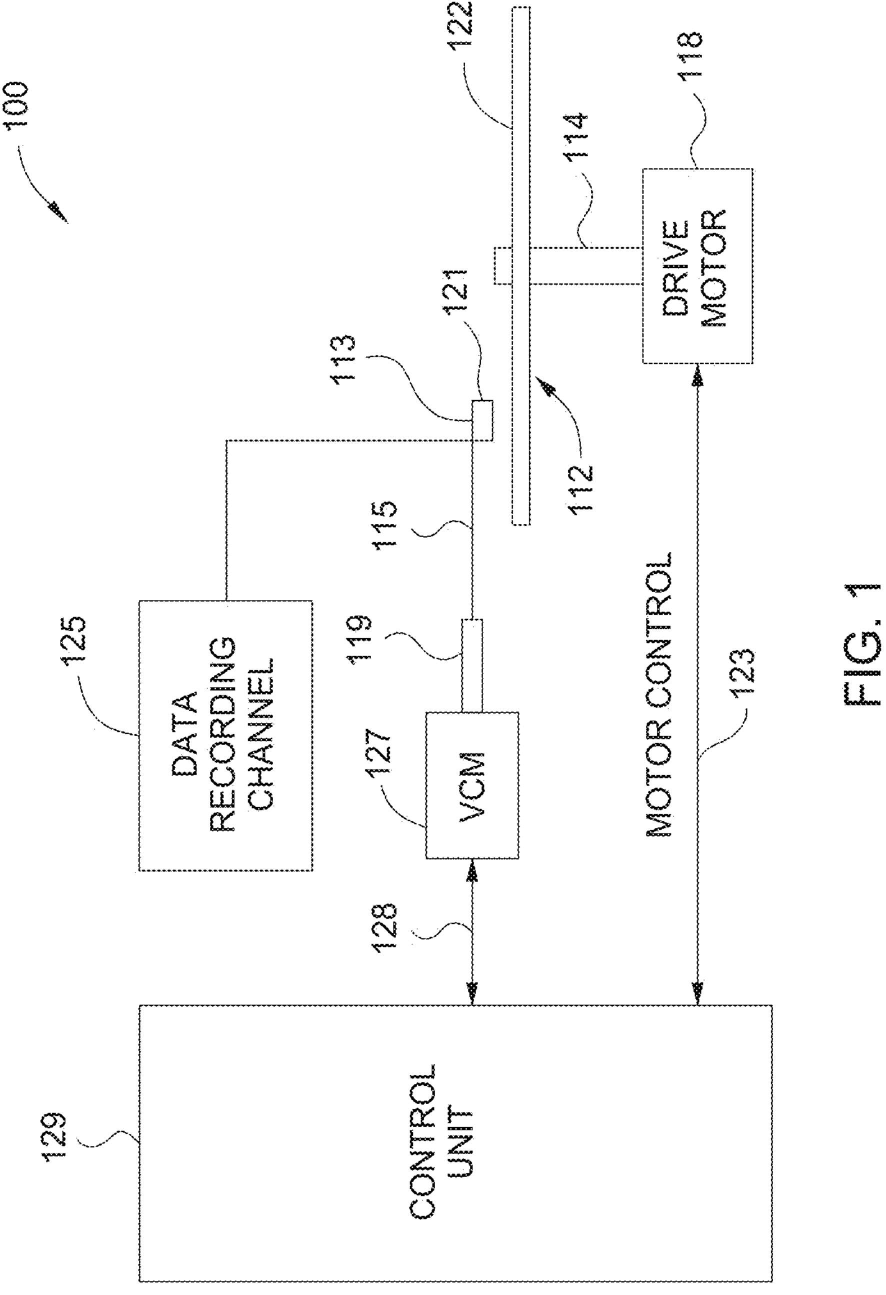
FIG. 1 is a schematic illustration of certain embodiments of a magnetic drive including a read/write head.

FIG. 1 is a schematic illustration of certain embodiments of a magnetic drive 100 including a read/write head. Such a magnetic media drive may comprise a single disk and head or multiples thereof. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that optionally include a four-terminal read head. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

The various components of the disk drive 100 are controlled in operation by control signals generated by control unit 129, such as access control signals and internal clock signals. Typically, the control unit 129 comprises logic control circuits, storage means and a central processing unit (CPU). The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders.

It is to be understood that the embodiments discussed herein are applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
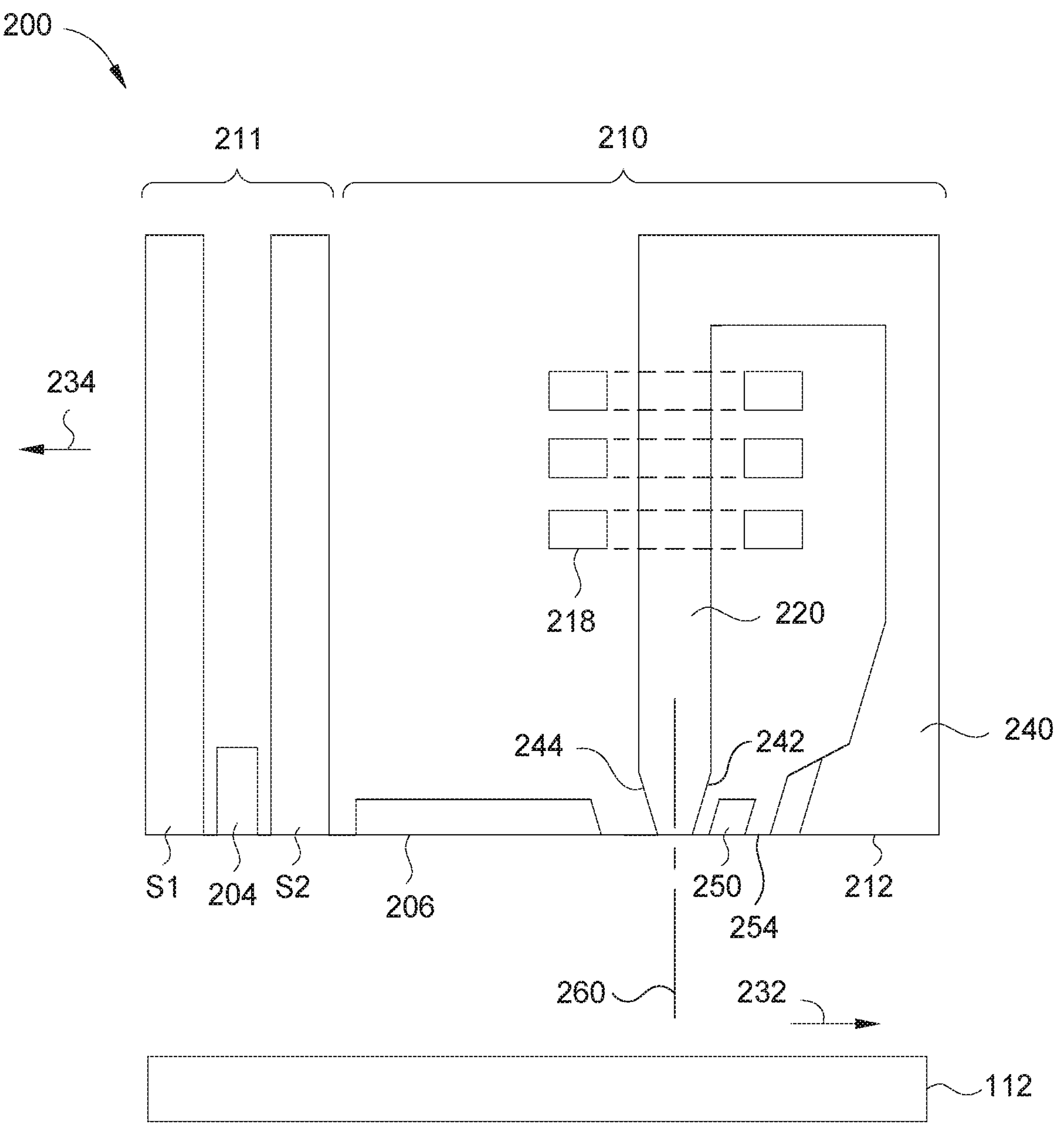
FIG. 2 is a fragmented, cross-sectional side view of certain embodiments of a read/write head.

FIG. 2 is a fragmented, cross-sectional side view of certain embodiments of a read/write head 200. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. In yet another embodiment, the magnetic read head 211 is a four-terminal device with sensing layers 204 that utilize Hall effects such as the spin Hall effect or anomalous Hall effect between MR shields S1 and S2. The magnetic fields of the adjacent magnetized regions in the magnetic disk 112 are detectable by the MR, MTJ, or Hall effect sensing element 204 as the recorded bits.

The write head 210 includes a main pole 220, a leading shield 206, a trailing shield 240, an optional spin torque oscillator (STO), spintronic or conductive device 250, and a coil 218 that excites the main pole 220. The coil 218 may have a "pancake" structure which winds around a back-contact between the main pole 220 and the trailing shield 240, instead of a "helical" structure shown in FIG. 2. When included, e.g., to achieve a Microwave Assisted Magnetic Recording (MAMR) effect or enhanced Perpendicular Magnetic Recording (ePMR), the STO, spintronic or conductive device 250 is formed in a gap 254 between the main pole 220 and the trailing shield 240. In certain embodiments, the read/write head 200 additionally includes mechanisms (not shown) for supporting Heat Assisted Magnetic Recording (HAMR), which may include a waveguide coupled to a light source and a near field transducer (NFT) placed adjacent to the main pole 220 and coupled to the waveguide to convert the delivered light into a heating spot on the media. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a NiFeCo alloy. The leading shield 206 and the trailing shield 240 may be a magnetic material, such as a NiFeCo alloy.

Figure 3:
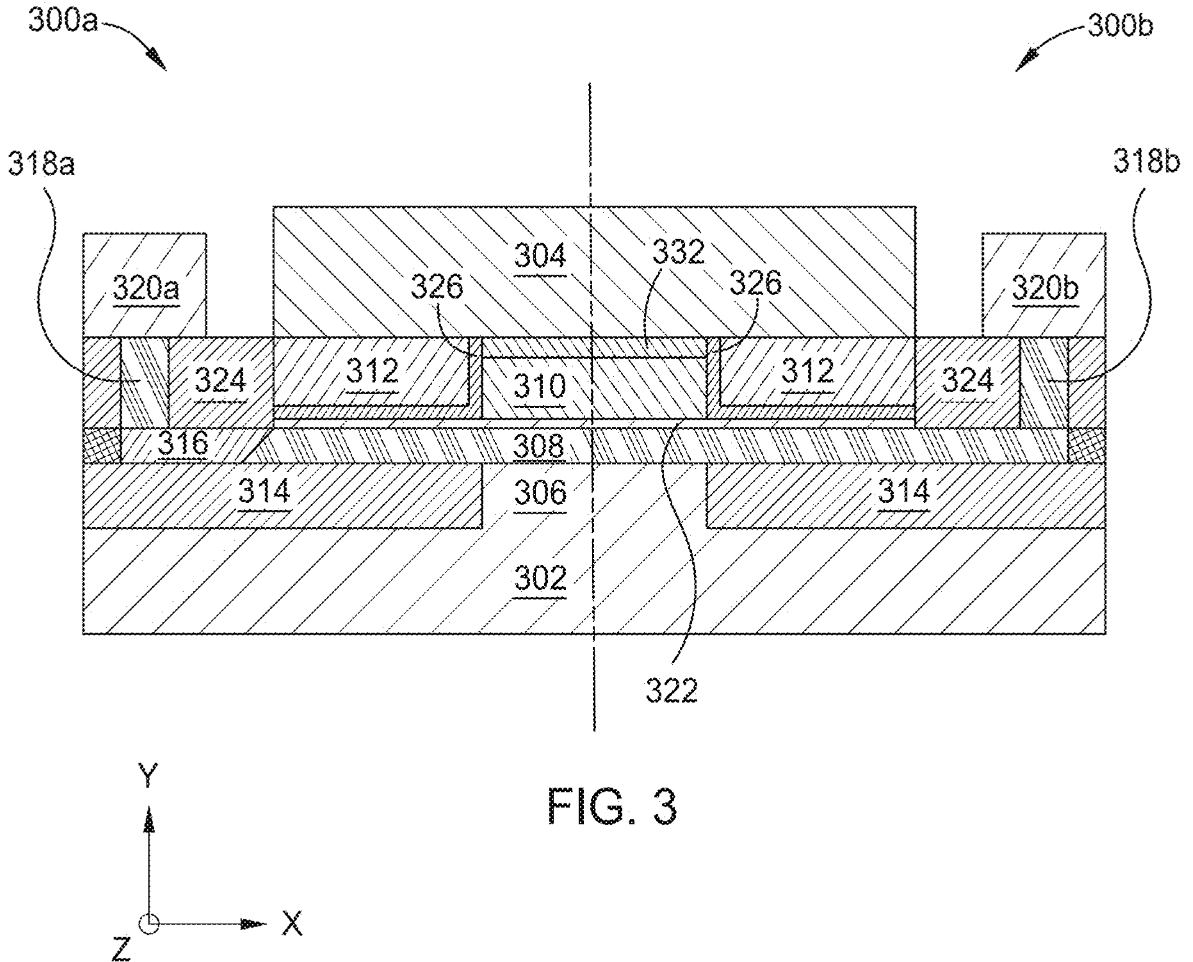
FIG. 3 illustrates portions of read heads comprising two top connections.

FIG. 3 illustrates portions of read head stacks 300*a*, 300*b* comprising two top contacts 320*a*, 320*b*. A portion of the read head stack 300*a* is shown on the left-hand side, and a portion of the read head stack 300*b* is shown on the right-hand side. While half of each read head stack 300*a*, 300*b* is shown, each read head stack 300*a*, 300*b* is symmetrical. Each read head stack 300*a*, 300*b* comprises a bottom shield 302 having a notch 306, a sensing layer 308 disposed on the notch 306, an optional spacer layer 322 disposed on the sensing layer 308, a free layer 310 disposed on the optional spacer layer 322 or sensing layer 308, a non-magnetic cap layer 332 disposed on the free layer, and a top shield 304 disposed over the cap layer 332. An insulating layer 314 is disposed over the bottom shield 302 adjacent to the notch 306 in both the x-direction and the −x-direction. Side shields 312 are disposed adjacent to the free layer 310 in the x-direction and the −x-direction, and are spaced from the free layer 310 and the spacer layer 322 or the sensing layer 308 by insulating layers 326.

In the read head stack 300*a*, the sensing layer 308 extends in the −x-direction to a metal lead 316, where the metal lead 316 is disposed in contact with a first via 318*a*, and in the x-direction to a second via 318*b*. The first via 318*a* extends in the y-direction to a first contact 320*a*. While not shown, a second metal lead 316 is disposed adjacent to the sensing layer 308 in the x-direction, which then extends to the second via 318*b* and second contact 320*b*. In the read head stack 300*b*, the second via 318*b* extends in the y-direction to a second contact 320*b*. The read head stack 300*b* is similar to the read head stack 300*a*; however, the read head stack 300*b* does not comprise metal leads. In each read head stack 300*a*, 300*b*, first and second vias 318*a*, 318*b* are disposed adjacent to the side shields 312, and are spaced from the side shields 312 by an insulating layer 324.

The sensing layer 308 has a length in the x-direction extending from either the metal leads 316 in the read head stack 300*a* or the vias 318*a*, 318*b* in the read head stack 300*b*. Due to the size of the side shields 312, the vias 318*a*, 318*b* and the contacts 320*a*, 320*b* are spaced a great distance from the free layer 310. As such, parasitic electrical resistance may occur during read operations, resulting in a lower signal-to-noise ratio (SNR). The parasitic electrical resistance and the low SNR may interfere with read operations, decreasing the overall capability of the read head stack 300.

FIGS. 4A-8B illustrate various read heads 400, 500, 600, 700, and 800, according to various embodiments. Each read head 400, 500, 600, 700, and 800 may individually correspond to, or be a part of, the magnetic head assembly 121 described in FIG. 1. Each read head 400, 500, 600, 700, and 800 may individually correspond to, or be a part of, the read/write head 200 described in FIG. 2, such as the magnetic read head 211. Each read head 400, 500, 600, 700, and 800 may utilize effects such as the inverse spin Hall effect, the spin Hall effect, or the anomalous Hall effect. Aspects of the read heads 400, 500, 600, 700, and 800 may be used in combination with one another.

Figures 4A, 4B:
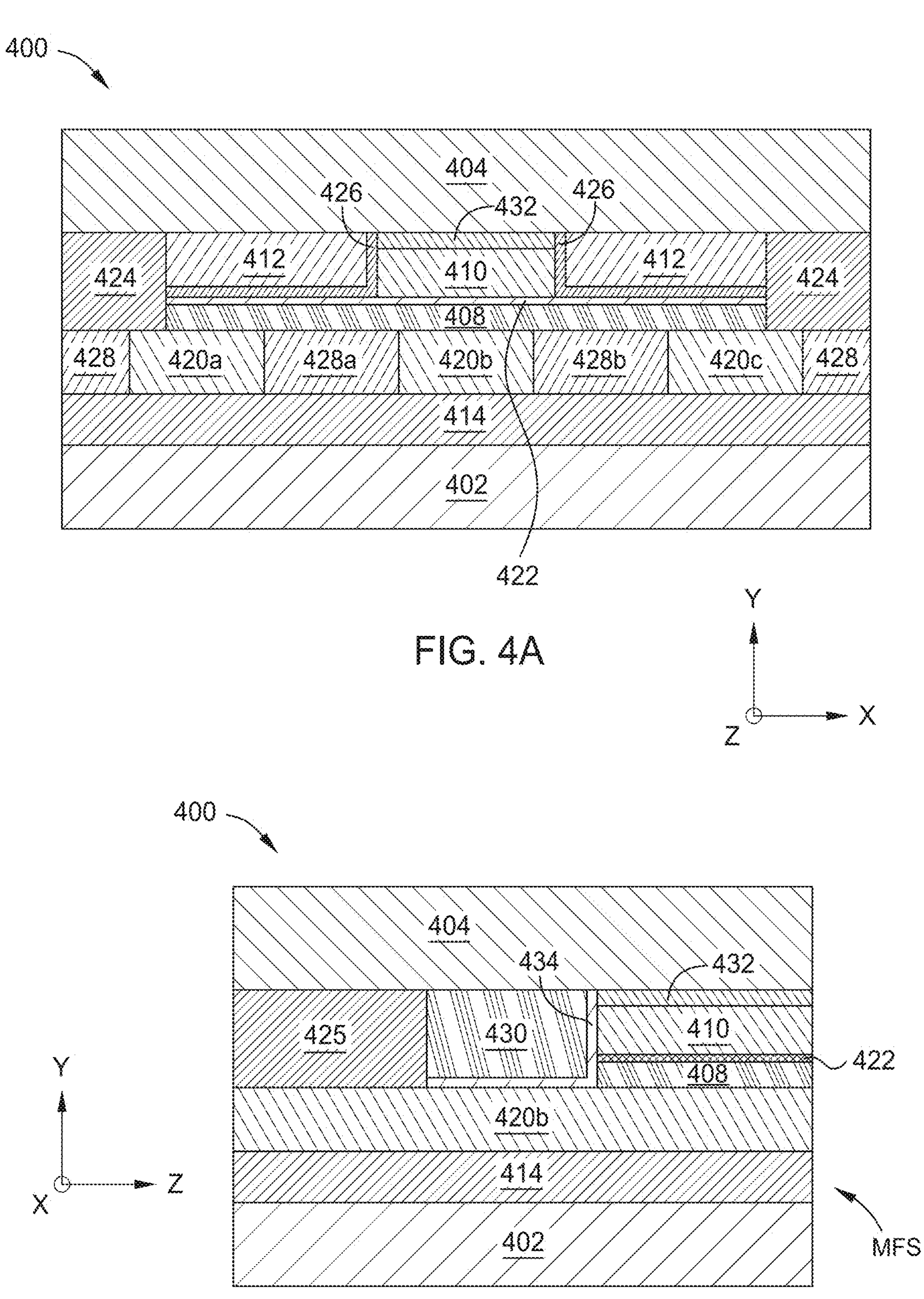

FIG. 4A illustrates a media facing surface (MFS) view of a read head 400, according to one embodiment. FIG. 4B illustrates a cross-sectional view through the center of the read head 400, and FIG. 4C illustrates a top view (without the top shield 404) of the read head 400.

The read head 400 comprises a bottom shield 402, an insulating layer 414 disposed on the bottom shield and, a first lead 420*a*, a second lead 420*b*, and a third lead 420*c* each disposed on the insulating layer 414. The first, second, and third leads 420*a*-420*c* are spaced from one another by an insulating layer 428, and may be disposed at the MFS, or recessed from the MFS. For example, a first portion 428*a* of the insulating layer 428 is disposed between the first and second leads 420*a*, 420*b*, and a second portion 428*b* of the insulating layer 428 is disposed between the second and third leads 420*b*, 420*c*. The first and second portions 428*a*, 428*b* may have a length in the x-direction of less than or equal to about 250 nm, such as about 10 nm to about 200 nm. In other words, the second lead 420*b* is spaced from the first lead 420*a* and the third lead 420*c* by the length of the first and second portions 428*a*, 428*b*. A sensing layer 408 is disposed on and in contact with the first, second, and third leads 420*a*-420*c* and portions of the insulating layer 428.

An optional spacer layer 422 is disposed on the sensing layer 408, a free layer 410 is disposed on the spacer layer 422, a cap layer 432 is disposed on the free layer 410, and a top shield 404 is disposed on the cap layer 432. Side shields 412, which may be soft bias side shields, are disposed adjacent to the free layer 410 in both the x-direction and the −x-direction, where the side shields 412 are spaced from the free layer and spacer layer 422 or sensing layer 408 by insulating layers 426. Insulating layers 424 are disposed adjacent to the side shields 412. In some embodiments, the insulating layer 424 and portions of the insulating layer 428 are one insulating layer. The insulating layer 424 may be partially disposed in contact with the first lead 420*a* and the third lead 420*c*. The first and third leads 420*a*, 420*c* may be at least partially vertically aligned with the side shields 412 in the y-direction, or in a direction parallel to the MFS. In some embodiments, the sensing layer 408, the optional spacer layer 422, the free layer 410, and the cap layer 432 may be referred to collectively as a sensor.

As shown in FIG. 4B, an optional rear bias 430 can be disposed behind the free layer 410, recessed from the MFS. The rear bias 430 is spaced from the free layer 410 by an insulating layer 434. An insulating layer 425 is disposed behind the rear bias 430. In some embodiments, the insulating layers 424 and 425 may be one insulating layer. In some embodiments, the rear bias 430 is optional, and is instead an insulating material. As shown in FIG. 4C, each lead 420*a*-420*c* may be connected to a via 440*a*, 440*b*, 440*c*, where the vias 440*a*-440*c* are recessed from the MFS and surrounded by an insulating layer 438. The vias 440*a*-440*c* may be connected to metallic contacts (not shown) separate from the top shield 404 that are connected to either a current source or a voltmeter/ohmmeter.

By utilizing three leads 420*a*-420*c* underneath the sensing layer 408, rather than top vias like shown in FIG. 3, the three leads 420*a*-420*c* can be disposed very closely to the free layer 410, without interfering with the side shields 412. Furthermore, because of the associated decrease in parasitic electrical resistance, the leads 420*a*-420*c* improve the SNR compared to the top vias. Because the first and third leads 420*a*, 420*c* can be under the side shields 412 in the y-direction, electric parasitic losses are avoided.

The read head 400 can be used to apply and/or measure current, voltage, resistance, or a combination thereof, where the current is perpendicular to the voltage and/or resistance. For example, when current is applied to the read head 400, the current flows horizontally (i.e., in the x-direction) through the sensing layer 408, and the voltage or resistance is measured vertically between the second lead 420*b* and the top shield 404. In another example, current may be sourced from the second via 440*b* up through the sensing layer 408 and free layer 410 to the top shield 404, and voltage or resistance is measured between the first via 440*a* and the third vias 440*c*.

In some embodiments, the leads 420*a*-420*c* each individually comprises a magnetic material, such as a NiFe alloy. In other embodiments, the leads 420*a*-420*c* each individually comprises a non-magnetic material, such as Cr, Ta, or Ru. The leads 420*a*-420*c* may be pinned or unpinned. The leads 420*a*-420*c* may have a width in the y-direction of about 20 nm to about 200 nm, a length in the x-direction of about 5 nm to about 20 μm, and a width in the z-direction of about 5 μm to about 10 μm.

The sensing layer 408 may comprise a topological insulator or topological semi-metal material, such as BiSb, BiSbX, where X is a dopant such as Ge or Cu, or YBiPt; a spin Hall material, such as Ta; or a ferromagnetic or antiferromagnetic material with large anomalous Hall effect, such as CoMnAl. The sensing layer 408 may have a width in the y-direction of about 1 nm to about 20 nm, a length in the x-direction of about 5 nm to about 1 μm, and a width in the z-direction of about 10 nm to about 100 nm. The free layer 410 may include a magnetic material, such as NiFe or CoFe. The free layer 410 may have a width in the y-direction of about 5 nm to about 20 nm, a length in the x-direction of about 5 nm to about 30 nm, and a width in the z-direction of about 5 nm to about 100 nm. The insulating layers 414, 424, 425, 426, 428 may each individually comprise AlOx, AlN, TaOx, SiN, or $SiO_2$, where x is a numeral greater than 1. The side shields 412 may comprise magnetic materials, such as alloys selected from Ni, Fe, and Co. The bottom and top shields 402, 406 may each individually comprise a magnetic material, such as alloys selected from Ni, Fe, and Co.

Figures 5A, 5B:
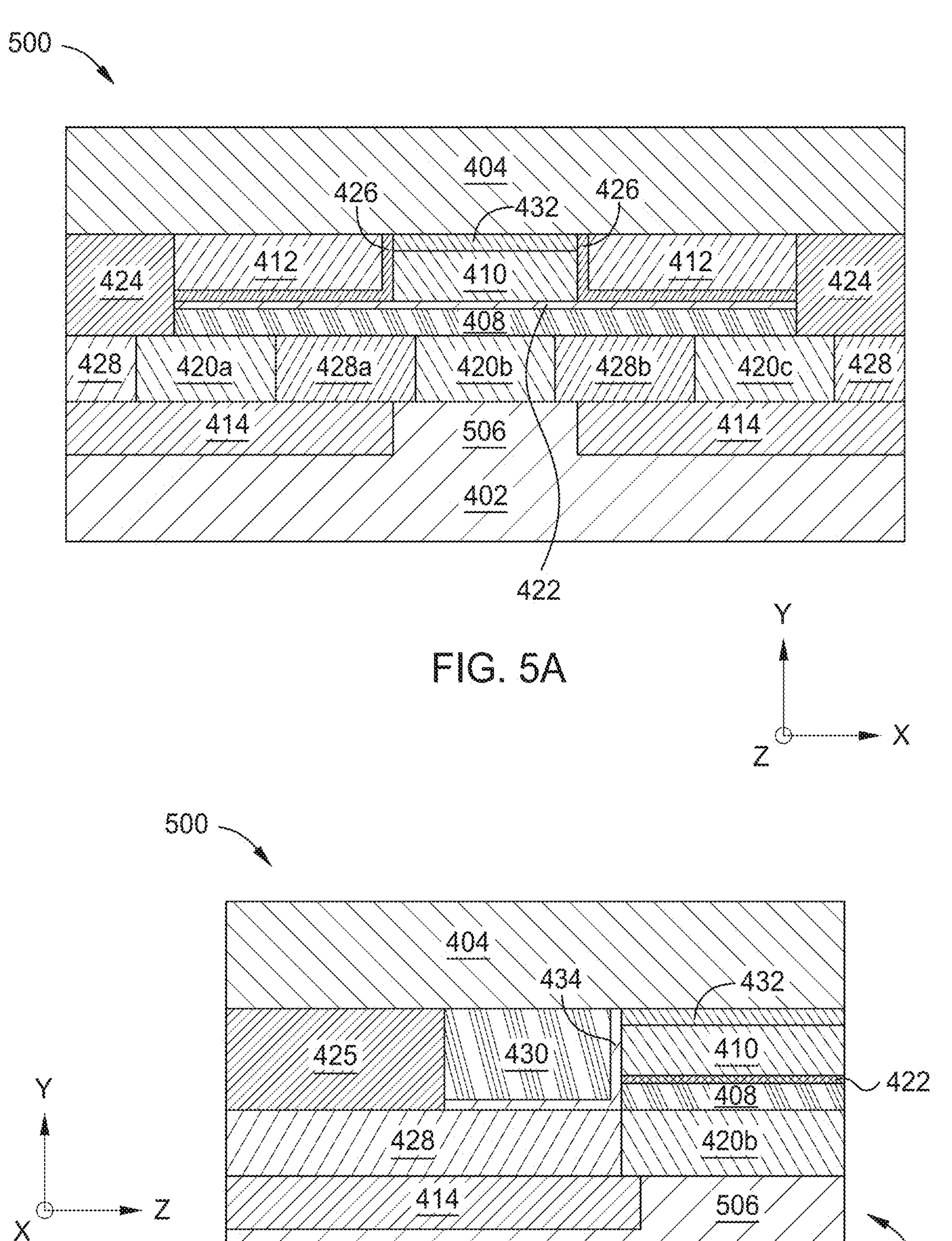
FIG. 5A-5B illustrate a read head, according to another embodiment.

FIGS. 5A-5B illustrate a read head 500, according to another embodiment. FIG. 5A illustrates an MFS view of the read head 500, and FIG. 5B illustrates a cross-sectional view through the center of the read head 500. The read head 500 is similar to the read head 400 of FIGS. 4A-4C; however, the bottom shield 402 further comprises a notch 506. The notch 506 comprises the same material as the bottom shield 402. The notch 506 is disposed in contact with the second lead 420*b*, and extends from the bottom shield 402 to the second lead 420*b* in the y-direction. The notch 506 electrically couples the bottom shield 402 to the second lead 420*b*. The notch 506 may have a width in the y-direction of about 5 nm to about 1 μm, a length in the x-direction of about 5 nm to about 50 nm, and a depth in the z-direction of about 5 nm to about 20 μm. The insulating layer 414 is disposed on either side of the notch 506 in the x-direction and the −x-direction.

Figures 6A, 6B:
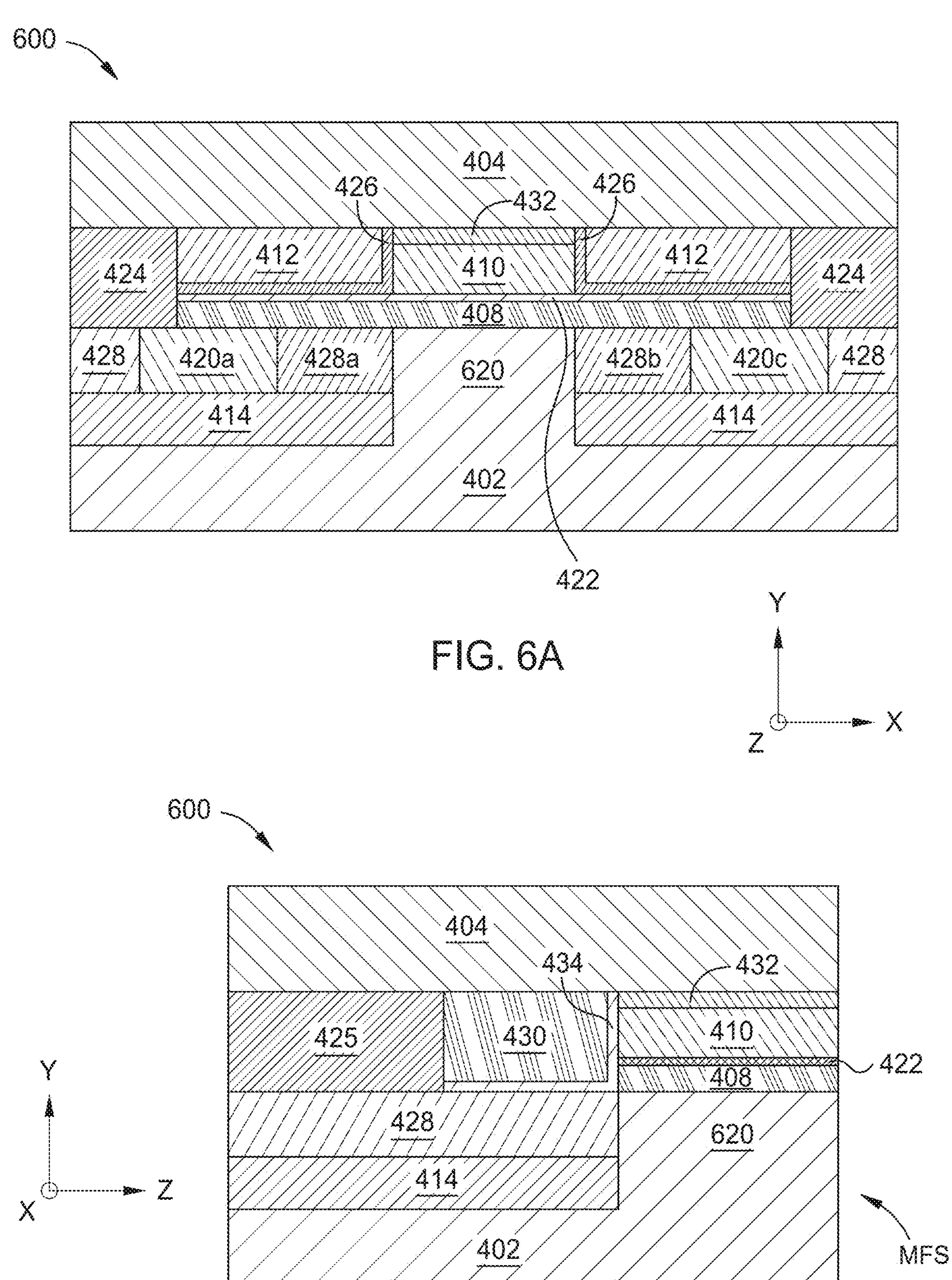
FIG. 6A-6B illustrate a read head, according to yet another embodiment.

FIGS. 6A-6B illustrate a read head 600, according to another embodiment. FIG. 6A illustrates an MFS view of the read head 600, and FIG. 6B illustrates a cross-sectional view through the center of the read head 600. The read head 600 is similar to the read head 500 of FIGS. 5A-5B; however, the second lead 420*b* and the notch 506 are now a second lead 620 that is part of the bottom shield 402. The second lead 620 extends in the y-direction from the bottom shield 402 to the sensing layer 408. The second lead 620 may have a width in the y-direction of about 5 nm to about 1 μm, a length in the x-direction of about 5 nm to about 50 nm, and a depth in the z-direction of about 5 nm to about 20 μm.

Figures 7A, 7B:
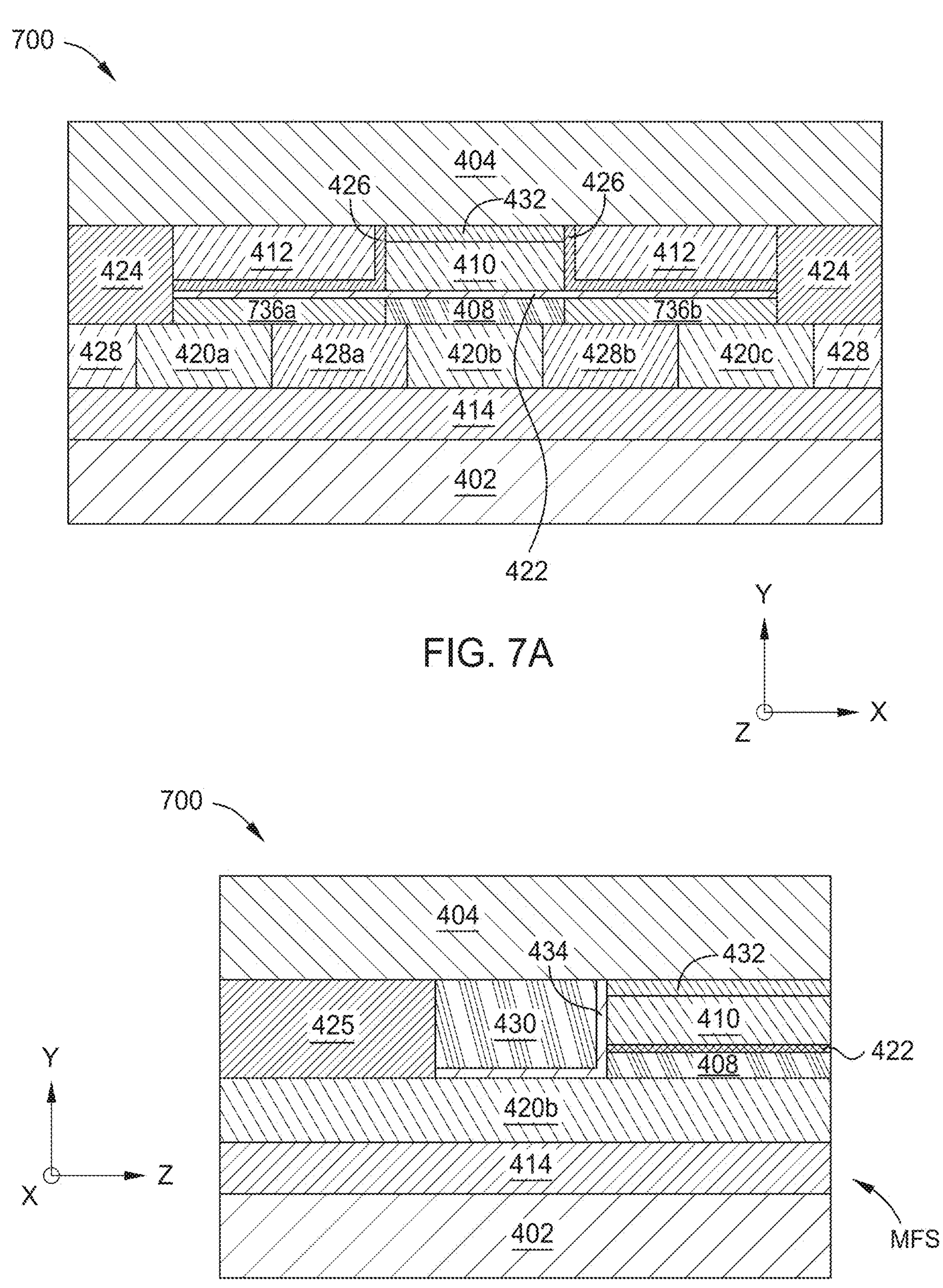
FIG. 7A-7B illustrate a read head, according to another embodiment.

FIGS. 7A-7B illustrate a read head 700, according to another embodiment. FIG. 7A illustrates an MFS view of the read head 700, and FIG. 7B illustrates a cross-sectional view through the center of the read head 700. The read head 700 is similar to the read head 400 of FIGS. 4A-4C; however, the sensing layer 408 has a length in the x-direction of about 5 nm to about 50 nm. A first conducting layer 736*a* and a second conducting layer 736*b* are disposed in contact with the sensing layer 408, where the first conducting layer 736*a* is disposed on a first side (i.e., in the −x-direction) of the sensing layer 408, and the second conducting layer 736*b* is disposed on a second side (i.e., in the x-direction) of the sensing layer 408. The first and second conducting layers 736*a*, 736*b* may each individually comprise materials such as Cr, Ta, or Ru.

Figures 8A, 8B:
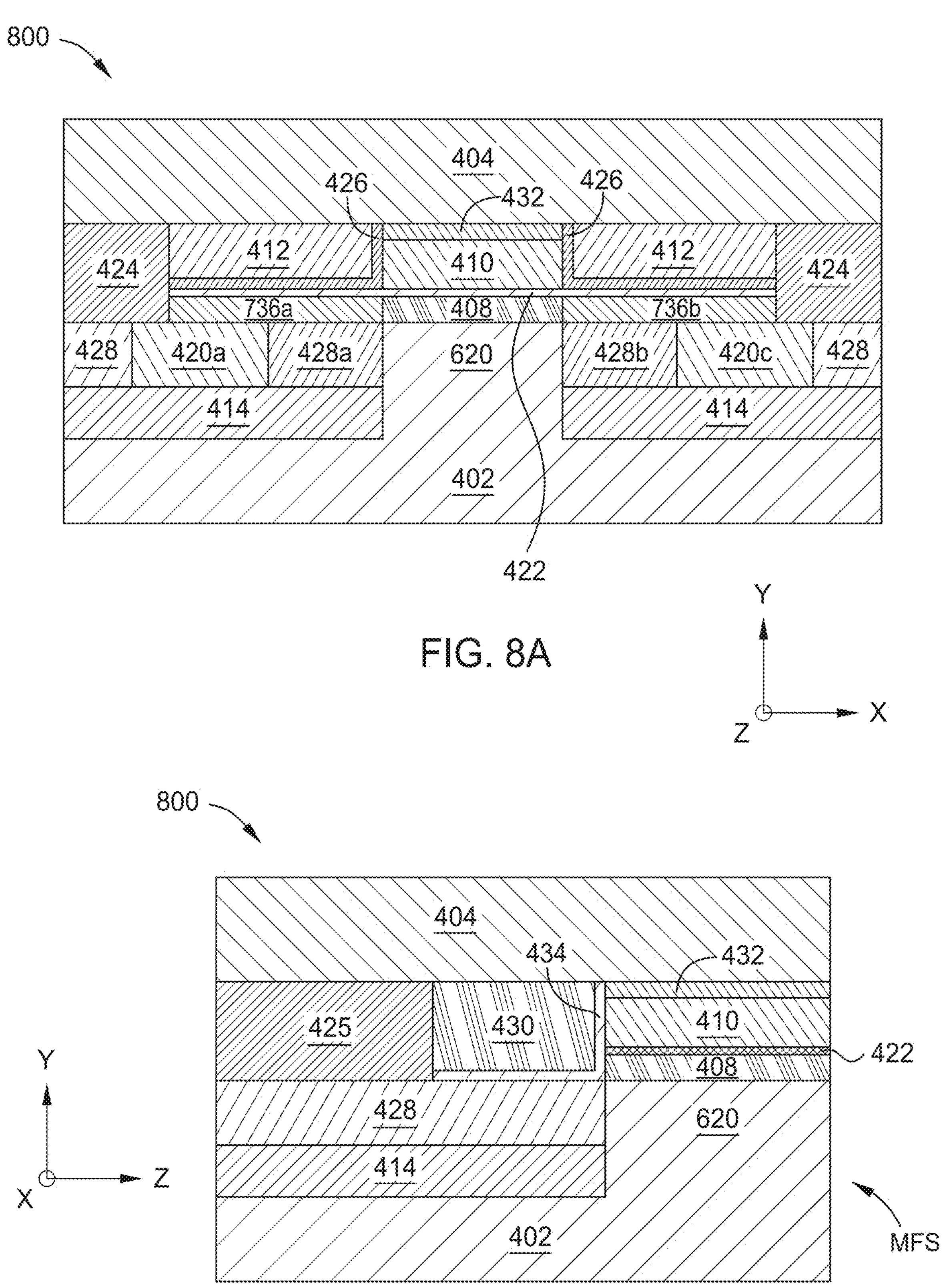
FIG. 8A-8B illustrate a read head, according to another embodiment.

FIGS. 8A-8B illustrate a read head 800, according to yet another embodiment. FIG. 8A illustrates an MFS view of the read head 800, and FIG. 8B illustrates a cross-sectional view through the center of the read head 800. The read head 800 is similar to the read head 600 of FIGS. 6A-6B and the read head 700 of FIG. 7A-7B; however, the read head 800 comprises the second lead 620 of the read head 600 and the first and second conducting layers 736*a*, 736*b* of the read head 700. The second lead 620 extends to the sensing layer 408. The first conducting layer 736*a* is disposed on a first side (i.e., in the −x-direction) of the sensing layer 408, and the second conducting layer 736*b* is disposed on a second side (i.e., in the x-direction) of the sensing layer 408.

By utilizing more than one lead underneath the sensing layer rather than on top of the read head, electrical contact may be made very close to the free layer 410, without interfering with the side shields. Furthermore, the leads improve the SNR compared to top vias, especially at narrow track widths. Because the first and third leads may be underneath the side shields in the y-direction, electric parasitic losses are avoided. Lastly, read heads comprising three bottom leads and one top lead can be utilized to take advantage of phenomena such as the spin Hall effect or anomalous Hall effect.

In one embodiment, a read head comprises a bottom shield, a first lead disposed over the bottom shield, a second lead disposed adjacent to the first lead, a third lead disposed adjacent to the second lead, a sensing layer disposed in contact with at least the second lead, a free layer disposed over the sensing layer, a first side shield disposed adjacent to the free layer, a second side shield disposed adjacent to the free layer, and a top shield disposed over the free layer and the first and second side shields.

The bottom shield further comprises a notch, the notch being in contact with the second lead. The read head further comprises an insulating layer disposed between the bottom shield and the first, second, and third leads. The bottom shield comprises the second lead. The sensing layer has a length of about 5 nm to 1 μm, and wherein the sensing layer, the first, second, and third leads, and the free layer are each individually disposed at a media facing surface. The read head further comprises a first conducting layer disposed in contact with the sensing layer and a portion of the first lead, and a second conducting layer disposed in contact with the sensing layer and a portion of the third lead. The read head further comprises a spacer layer disposed between the sensing layer and the free layer. The sensing layer and the free layer collectively provide sensing of an external magnetic field via one of an inverse spin Hall effect, a spin Hall effect, or an anomalous Hall effect. The sensing layer comprises a topological insulator, a topological semi-metal, or a spin Hall material. The sensing layer comprises a ferromagnetic or antiferromagnetic material with large anomalous Hall effect. A magnetic recording device comprises the read head.

In another embodiment, a read head comprises a bottom shield comprising a first lead, a second lead disposed over the bottom shield adjacent to the first lead, a third lead disposed over the bottom shield adjacent to the first lead, a sensing layer disposed in contact with at least the first lead, a free layer disposed over the sensing layer, a first side shield disposed adjacent to the free layer, a second side shield disposed adjacent to the free layer, and a top shield disposed over the free layer and the first and second side shields.

The sensing layer is disposed in contact with the second and third leads. The read head further comprises a first conducting layer disposed in contact with the sensing layer and the second lead, and a second conducting layer disposed in contact with the sensing layer and the third lead. The read head further comprises a rear bias disposed adjacent to the free layer, the rear bias being recessed from a media facing surface. The first lead, the second lead, and the third lead are disposed at a media facing surface. The first lead, the second lead, and the third lead are recessed from a media facing surface. The second lead is spaced from the first lead and the third lead a distance less than or equal to about 1 μm. The sensing layer and the free layer collectively provide sensing of an external magnetic field via one of an inverse spin Hall effect, a spin Hall effect, or an anomalous Hall effect. The sensing layer comprises a topological insulator, a topological semi-metal, or a spin Hall material. A magnetic recording device comprises the read head.

In yet another embodiment, a read head comprises a bottom shield comprising a notch, a first lead disposed over the bottom shield at a media facing surface (MFS), a second lead disposed adjacent to the first lead at the MFS, a third lead disposed adjacent to the first lead at the MFS, a sensing layer disposed in contact with at least the first lead, a free layer disposed over the sensing layer, and a top shield disposed over the free layer.

The read head further comprises a spacer layer disposed between the sensing layer and the free layer. The sensing layer is further disposed in contact with the first lead and the third lead, the sensing layer having a length of about 5 nm to about 1 μm. The read head further comprises a first conducting layer disposed in contact with the sensing layer and the first lead, a second conducting layer disposed in contact with the sensing layer and the third lead, and a rear bias disposed adjacent to the free layer, the rear bias being recessed from the MFS, wherein the sensing layer has a length of about 5 nm to about 100 nm. The sensing layer and the free layer collectively provide sensing of an external magnetic field via one of an inverse spin Hall effect, a spin Hall effect, or an anomalous Hall effect. The sensing layer comprises a topological insulator, a topological semi-metal, or a spin Hall material. A magnetic recording device comprises the read head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
- a bottom shield;
- a first lead disposed over the bottom shield;
- a second lead disposed adjacent to the first lead
- a third lead disposed adjacent to the second lead, the first, second, and third leads being disposed at a media facing surface (MFS);
- a sensing layer disposed in contact with at least the second lead;
- a spacer layer disposed in contact with the sensing layer;
- a free layer disposed in contact with the spacer layer;
- a cap layer disposed in contact with the free layer;
- a first side shield disposed adjacent to the free layer;
- a second side shield disposed adjacent to the free layer; and
- a top shield disposed over the first and second side shields, the top shield being disposed in contact with the cap layer.

2. The read head of claim 1, wherein the bottom shield further comprises a notch, the notch being in contact with the second lead.

3. The read head of claim 1, further comprising an insulating layer disposed between the bottom shield and the first, second, and third leads.

4. The read head of claim 1, wherein the bottom shield comprises the second lead.

5. The read head of claim 1, wherein the sensing layer has a length of about 5 nm to about 1 μm, and wherein the free layer is disposed at a media facing surface.

6. The read head of claim 1, further comprising:
- a first conducting layer disposed in contact with the sensing layer and a portion of the first lead; and
- a second conducting layer disposed in contact with the sensing layer and a portion of the third lead.

7. The read head of claim 1, wherein the sensing layer and the free layer collectively provide sensing of an external magnetic field via one of an inverse spin Hall effect, a spin Hall effect, or an anomalous Hall effect.

8. The read head of claim 1, wherein the sensing layer comprises a topological insulator, a topological semi-metal, or a spin Hall material.

9. The read head of claim 1, wherein the sensing layer comprises a ferromagnetic or antiferromagnetic material with large anomalous Hall effect.

10. A magnetic recording device comprising the read head of claim 1.

11. A read head, comprising:
- a bottom shield comprising a first lead disposed at a media facing surface (MFS);
- a second lead disposed over the bottom shield adjacent to the first lead;
- a third lead disposed over the bottom shield adjacent to the first lead;
- a sensing layer disposed in contact with at least the first lead;
- a free layer disposed over the sensing layer;
- a first side shield disposed adjacent to the free layer;
- a second side shield disposed adjacent to the free layer;
- a rear bias structure disposed adjacent to the sensing layer and the free layer, the rear bias structure being recessed from the MFS;
- one or more insulating layers disposed between the bottom shield and the rear bias structure, the one or more insulating layers being recessed from the MFS by at least the first lead; and
- a top shield disposed over the free layer and the first and second side shields.

12. The read head of claim 11, wherein the sensing layer is disposed in contact with the first, second, and third leads.

13. The read head of claim 11, further comprising:
- a first conducting layer disposed in contact with the sensing layer and the second lead; and
- a second conducting layer disposed in contact with the sensing layer and the third lead.

14. The read head of claim 11, wherein the first lead, the second lead, and the third lead are disposed at a media facing surface.

15. The read head of claim 11, wherein the first lead, the second lead, and the third lead are recessed from a media facing surface.

16. The read head of claim 11, wherein the second lead is spaced from the first lead and the third lead a distance less than or equal to about 1 μm.

17. The read head of claim 11, wherein the sensing layer and the free layer collectively provide sensing of an external magnetic field via one of an inverse spin Hall effect, a spin Hall effect, or an anomalous Hall effect.

18. The read head of claim 11, wherein the sensing layer comprises a topological insulator, a topological semi-metal, or a spin Hall material.

19. A magnetic recording device comprising the read head of claim 11.

20. A read head, comprising:

a bottom shield;

a first lead disposed over the bottom shield;

a second lead disposed adjacent to the first lead;

a third lead disposed adjacent to the second lead;

a sensing layer disposed in contact with at least the second lead;

a free layer disposed over the sensing layer;

a first conducting layer disposed in contact with the sensing layer and a portion of the first lead;

a second conducting layer disposed in contact with the sensing layer and a portion of the third lead;

a first side shield disposed adjacent to the free layer;

a second side shield disposed adjacent to the free layer; and a top shield disposed over the free layer and the first and second side shields.

21. The read head of claim 20, wherein the bottom shield comprises the second lead.

22. The read head of claim 20, wherein the sensing layer and the free layer collectively provide sensing of an external magnetic field via one of an inverse spin Hall effect, a spin Hall effect, or an anomalous Hall effect.

23. The read head of claim 20, wherein the sensing layer comprises a topological insulator, a topological semi-metal, or a spin Hall material.

24. The read head of claim 20, wherein the sensing layer comprises a ferromagnetic or antiferromagnetic material with large anomalous Hall effect.

25. A magnetic recording device comprising the read head of claim 20.

* * * * *